INVENTOR.
Philip G. Fleming

Oct. 8, 1963     P. G. FLEMING     3,105,995
MOLDING APPARATUS
Filed Feb. 11, 1960     4 Sheets-Sheet 3

INVENTOR.
Philip G. Fleming
BY

Oct. 8, 1963 P. G. FLEMING 3,105,995
MOLDING APPARATUS

Filed Feb. 11, 1960 4 Sheets-Sheet 4

INVENTOR.
Philip G. Fleming
BY

United States Patent Office 3,105,995
Patented Oct. 8, 1963

3,105,995
MOLDING APPARATUS
Philip G. Fleming, Livermore, Calif., assignor to the United States of America as represented by the United States Atomic Energy Commission
Filed Feb. 11, 1960, Ser. No. 8,197
7 Claims. (Cl. 18—30)

This invention relates to apparatus for molding coating on articles.

In order to provide reliable electronic circuitry it is necessary to protect such circuits together with their components from damage which may be caused by moisture, dirt, chemicals, thermal or physical shock, or from a combination of these. The technique of encapsulation or potting the circuitry in a mass of plastic material or thermosetting resin, hereinafter referred to generally by the term resin, promises to provide this protection and reliability.

It has been found, however, that potted circuitry prepared by simply enveloping the circuitry and components in a mass of resin may fail due to internal stresses. Such stresses may arise from the difference between the thermal coefficients of expansion of the resin and of the potted components, or from shrinkage of the resin during cure. At any time, these stresses may produce breakage of fragile potted components such as electron tubes, cracking of the cured resin mass, or both.

This trouble has led to the practice of applying various resilient coatings to components of such circuitry prior to potting in order to provide a stress relief or buffer zone between the circuit component and the resin mass. These various coatings have been applied by dipping, by spatula application, or by wrapping with the resilient material in tape form. These various coating application methods and the coated articles produced thereby have been unsatisfactory in many respects, among which are lack of uniformity in the coated product, the coatings produced may be permeable and therefore fail to isolate the resin from the article, and the methods used have largely involved expensive hand operations.

An ideal coating for such purpose should be resilient, have a relatively high deflection per unit of compressive load, be impermeable to the resin, be uniformly reproducible, and be economically applicable by method and means adaptable to high production manufacturing.

The present invention aims to overcome the various shortcomings of prior art coating techniques and to provide a coated article which is ideally suited for encapsulation.

An object of the invention is to provide new and improved apparatus for manufacturing coated articles.

Another object of the invention is to provide apparatus for furnishing elements with controlled thickness coatings in order to ultimately provide finished articles of uniform character, and to provide an economical means for the production of such articles.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention and various modifications thereof will have been chosen for purposes of illustration and description. The preferred embodiment and the modifications are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

Figure 1:
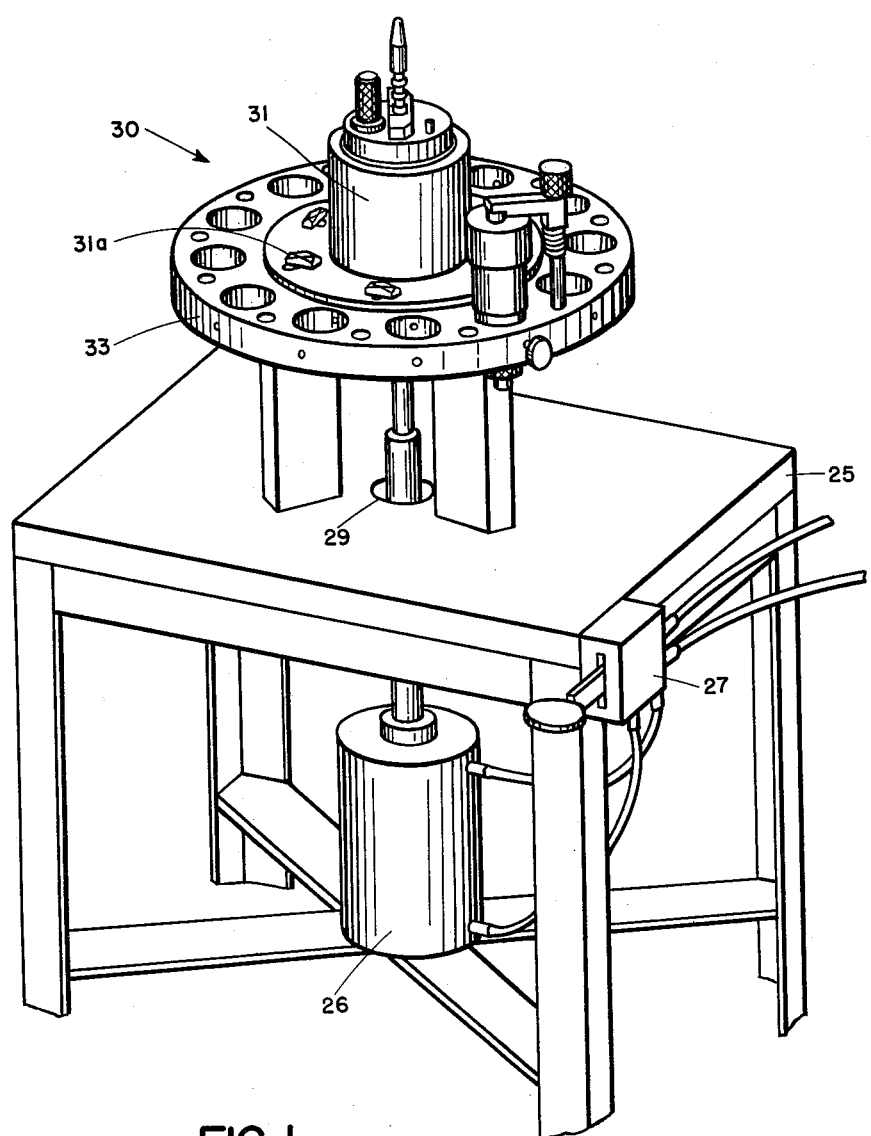
FIG. 1 is a perspective view, showing a generally preferred embodiment of the apparatus of the present invention but for clarity omitting all but one unit mold.

Described generally, the present invention comprises an apparatus capable of multiple production of coated articles or elements per cycle. This apparatus, as shown, may comprise transfer means, generally indicated by reference character 30, adapted to contain a suitable coating material and to transfer such material by means of interconnecting transmission conduits (FIGS. 2 and 3) to a plurality of radially arranged coating molds 60 which are adapted to internally and spacially hold the elements to be coated, such as indicated at 11, FIGS. 4, 8 and 9. The elements 11 are each disposed and maintained in spaced relation to the interior of the molds 60 so that the coating material may flow about the particular element and provide a suitable coating of material about the entire periphery thereof. The coating is shown in FIG. 9 and indicated by the reference character 12.

Although the element 11 is shown as being an electron tube, it is to be understood that this is but an example of the many types of electronic components such as transformers, resistors, capacitors, etc. which may serve as the inner element and be improved thereby. In addition, it should be pointed out that the inner element may include several electrically interconnected electronic components, and in which case the casing material may serve also to fill the inter-component spaces as well as to provide an exterior casing. Electrical leads 13 (FIG. 9) extend from the inner element 11 to enable appropriate connections to be made externally of the casing.

The casing 12 is comprised of resilient material, of more or less "spongy" character, which has attained its final structure in a controlled manner while in place on the inner element, i.e., which has been substantially foamed-in-place. Such a casing renders an inner element ideally suitable for potting or encapsulation within a resin mass (not shown), in that the coating so formed has a cellular but impervious reproducible cell structure having the qualities of resilient compressibility. These properties serve to substantially isolate and protect the inner element and the adjacent resin mass from damaging stresses and to further protect the inner element from damage due to various environmental conditions and thus enhance the overall reliability of the final encapsulated circuitry.

Heat may be applied to the mold by means of a heating coil (not shown) to promote the foaming or vulcanizing action although this is not required in all instances. Organopolysiloxane ("Silastic") compounds having room temperature vulcanizing and self-foaming properties have been found to be ideally suitable as a coating material in that, in addition to producing a very satisfactory product, the aforementioned properties eliminate the need for heated molds. It should be noted, however, that other starting compounds (foamed by heat application or otherwise) producing a cellular impervious resilient end product may be used, with utilization of heated molds to produce foaming and/or to accomplish vulcanization. The term "vulcanization" is used throughout this disclosure to means "cure" or alteration of the physical properties of a material by chemical reaction.

An exemplary and highly satisfactory formulation for a self foaming and room temperature vulcanizing material is comprised of two premixes, "A" and "B," which are combined shortly before introduction into the mold cavity. These premixes (parts by weight) are as follows:

*Premix "A"*

80 parts silicone resin _____ General Electric RTV 20.
20 parts blowing agent _____ General Electric #81792.

*Premix "B"*

1 part-catalyst _____. Nuodex #T–773.
3 to 12 parts diluent _____ General Electric #SF961500.

Premixes "A" and "B" are combined in the parts-by-weight ratio of 100 to 10 respectively.

Figure 2:
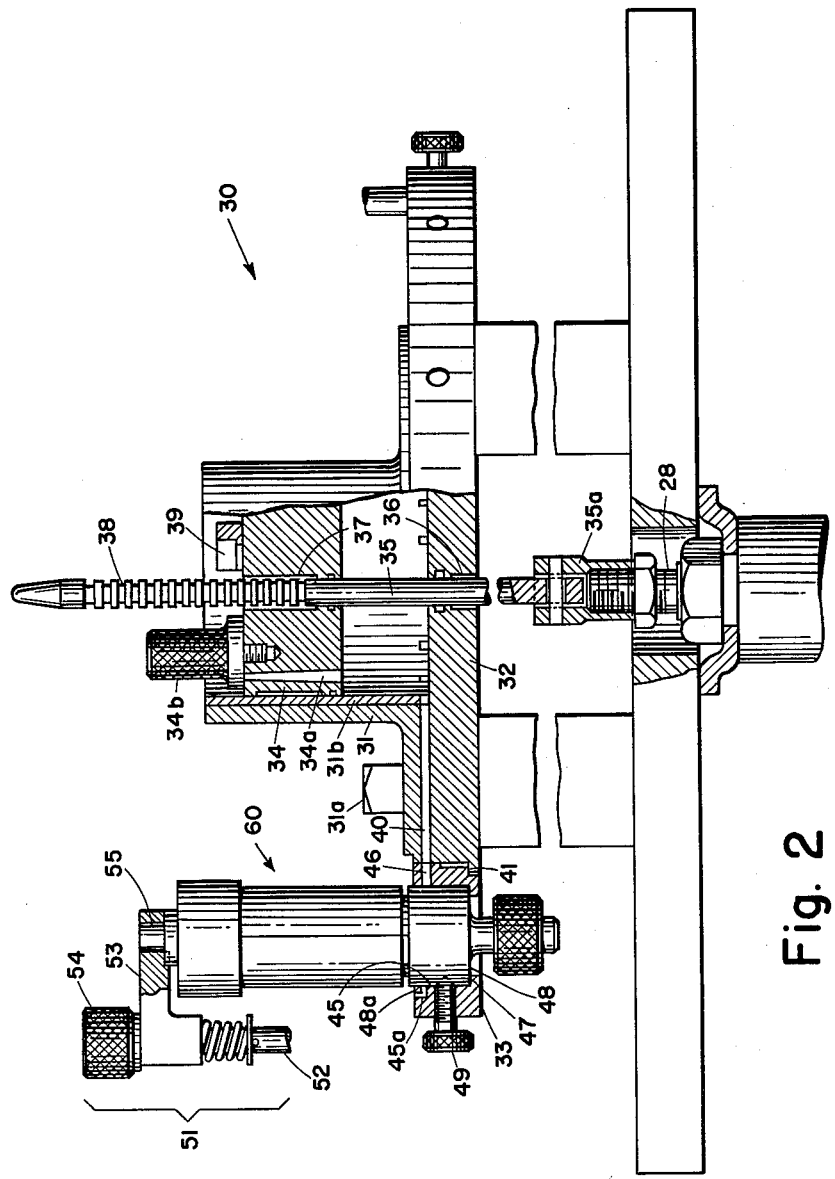
FIG. 2 is a sectional view of the upper portion of the device of FIG. 1 but with the illustrated unit mold located in a different station.
Figure 3:
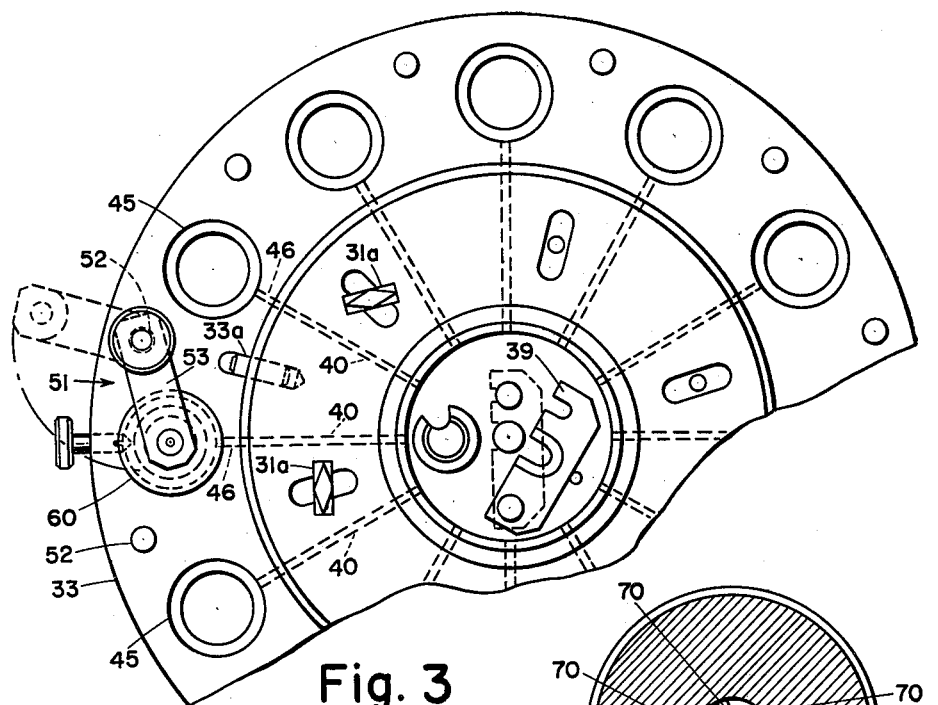
FIG. 3 is a partial plan view of the apparatus shown in FIG. 2.

A preferred form of apparatus for providing economical quantity production of the article is shown in FIGS. 1–3 to comprise a transfer molding means generally indicated at 30 mounted on a suitable supporting table structure 25 together with a pneumatic power cylinder 26 and control valve 27 to actuate and power the transfer molding means. Although the apparatus is adapted to produce protectively coated articles of the type disclosed herein, it may also be used to produce different types of articles comprising molded foam shapes having no inner element. The power cylinder is located under the table so that its piston rod is in longitudinally aligned relation with an opening 29 in said table and is adapted through suitable linkage to supply power to the transfer molding means which is in suitable aligned relation to both the opening and power cylinder.

As may be seen in FIGS. 1–3 the transfer molding means 30 is comprised of a central assembly made-up of a wide-flanged transfer cylinder 31 removably fastened by quick-acting screw locks 31a in superposed relation to a flat circular base plate 32 and a mold adapting ring 33, the inside diameter of which is in indexed circumferential abutting relation to the outside diameter of both said cylinder flange and said base plate. The underside of the base plate is held in spaced relation above the top of the table and in aligned relation to the opening 29 by suitable spacer blocks and machine screws. A sealed transfer piston 34 is operable within the transfer cylinder by means of transfer piston rod 35 which is longitudinally movable through sealed concentric openings 36 and 37 in the base plate and transfer piston respectively and which interconnects with the power cylinder piston rod at a point below the base plate.

The parts of the apparatus which come into contact with the molding material, where not otherwise specified, are preferably made of anodized coated aluminum, although any material which will not react with the molding material may be used. Because the anodized coatings are relatively thin and can not withstand much wear, the cylinder 31 is equipped with a replaceable liner 31b of solid non-reactive material, brass for example, in order to provide a greater thickness of non-reactive material and, thereby, provide a cylinder bore which is much more tolerant to the wear due to the relatively moving piston 34.

As may be most clearly seen in FIG. 2, one end portion of transfer piston rod 35 extends through the transfer piston and has a number of spaced annular stop grooves 38, any one of which may be engaged by a latch 39 pivotedly mounted on the upper surface of the transfer piston in order to adjustably locate the piston along the axis of the transfer piston rod. When so located, the distance from the underside of the transfer piston along the transfer piston rod 35, interconnecting link 35a, and power cylinder rod 28 to the underside of the power cylinder piston (not shown) becomes fixed and the bottoming of the power cylinder piston limits the downward stroke of the transfer piston. Thus it may be seen that the downward stroke displacement of the transfer piston is adjustably limitable. Piston 34 also has a vent channel 34a through which gasses or vacuum in the transfer cylinder may be vented when closure valve means 34b is opened.

The surface (lower) of the transfer cylinder flange has spaced radially extending transfer grooves 40 which extend from the cylinder bore to the peripheral edge of the flange. When the flange is secured to the base plate 32, the upper surface of the base plate serves to "cover" the open grooves and, in effect, render the grooves effective as closed fluid flow conduits. An important feature of the apparatus is that the transfer flow conduits (grooves 40) are readily accessible along their entire length for cleaning when the flanged transfer cylinder 31 is removed from the base plate.

The mold adapting ring 33 is interchangeable with others (not shown) to enable the central assembly of the transfer apparatus to be used with a variety of different molds, each type of which may be tailored to encase a particular inner element. As may be seen in FIG. 2, the adapter ring 33 is located vertically by co-acting shoulders 41, one on the inside diameter of the ring and one on the outside diameter of the base plate, and is angularly positioned with respect to the base plate by a locating dowel 33a projecting from the base plate into a "keyway" slot in the inside surface of the adapter ring. The adapting ring is thus definitely located with respect to the central assembly, but since the two have a slip interfit, the ring may be easily removed therefrom by a simple vertical movement.

A number of unit mold stations or retainers (vertical openings) 45 are angularly spaced along a suitable hole circle on the top surface of the adapting ring. Each retainer is radially intersected by an intermediate transfer conduit 46 leading from the inside surface of the ring. These conduits are located with respect to the adapting ring "keyway" slot and co-acting shoulders 41 such that each is in fluid conducting relation to one of the spaced transfer grooves 40 of the central assembly and thereby provides a continuous transfer path or conduit from the transfer cylinder to the inside of each retainer.

Figure 6:
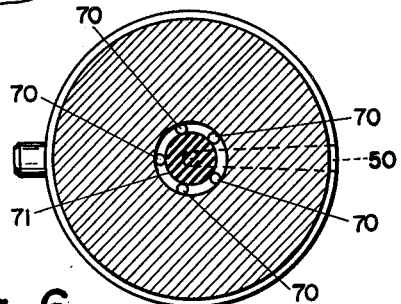
FIG. 6 is an enlarged transverse sectional view taken along line 6—6 of FIG. 5.
Figure 5:
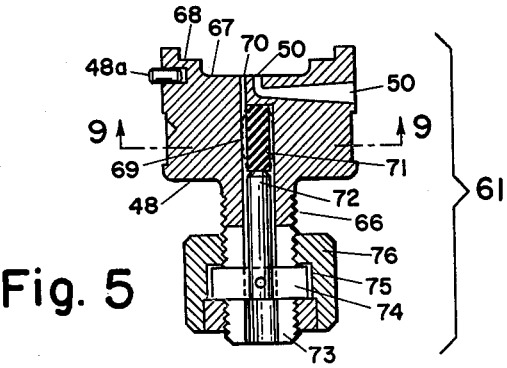
FIG. 5 is an enlarged view of the lower portion of FIG. 4.

These retainers each have an internal mold-positioning stop shoulder 47 and a radial "keyway" 45a which respectively serve to vertically and radially locate a corresponding mold base shoulder 48 and a dowel 48a radially projecting from the mold base to definitely position the mold base in its retainer in much the same manner as the adapted ring is positioned with respect to the central assembly. In addition to these locating means, each retainer 45 has a mold locking set screw 49 associated with it which is engageable with a conical countersink in the mold base when the mold base is properly seated in the retainer. These locating and locking elements serve to maintain sprue 50 (FIGS. 5 and 6) in fluid-conducting relation to the intermediate transfer conduit 46.

In addition, the adapter ring 33 is equipped with spaced hold-down mold-clamping units 51, one preferably in association with each retainer. These clamps are each comprised of a post 52 (for clarity, shown partly broken away and rotated into plane of paper in FIGURE 2) fastened to the adapter ring at a point in spaced relation to the centerline of its associated retainer 45. A clamping arm 53 is pivotally mounted about the post and is adjustably locatable along the post by a knurled clamping nut 54 which is threadedly engaged with the upper portion of the post. The arm member 53 is biased upwardly against the lower end of the nut by a compression spring which is, in turn, supported on the post by a dowel-located washer.

The distal end of the clamp arm contains a spot-faced opening 55 located with respect to the post 52 centerline such that it is in co-axial alignment with the retainer when the clamp arm is suitably radially located with respect to the post. A unit mold assembly 60 vertically extending from a retainer may be coaxially clamped in assembled relation by locating the spot-face over the upper end of the unit mold and then lowering the clamping arm by means of nut 54. The opening in the distal end of the clamp arm permits unobstructed venting of the mold cavity.

As has been indicated there are a number of mold positioning and retaining stations in a particular adapting ring 33, all preferably being of similar construction and operation and all preferably adapted to position and retain molds of similar type. This being so, the preceding and following description of a single mold station and mold will be understood to be applicable to all.

Figure 4:
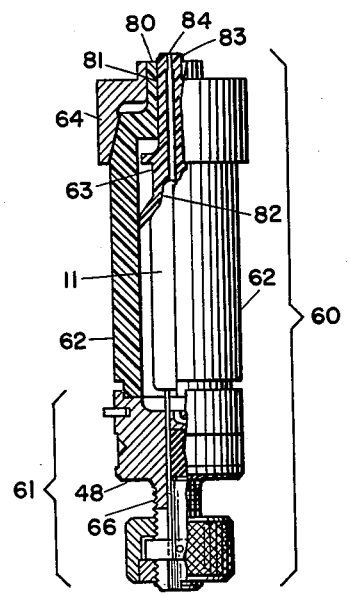
FIG. 4 is an enlarged sectional view of the unit mold shown in FIGS. 1 through 3.

The unit mold 60 is shown in detail in FIG. 4 to comprise a base member 61, a generally cylindrical longitudinally-parted intermediate mold portion 62, a vented centering plunger 63, and a clamping crown member 64. As has been described, the base member (shown enlarged in FIG. 5) seats and is fastened within retainer 45 so that mold feed sprue 50 is in fluid conducting relation to one of the radial transfer paths emanating from the transfer cylinder.

The upper surface of the mold base member comprises a shallow central depression 67 which is counterbored at 68 to provide a seat for the intermediate mold portion 62. This depressed portion of the upper surface forms the bottom of the mold cavity into which feed sprue 50 opens. The transfer paths referred to above are assembled in consequence of proper assembly of the mold adapting ring 33 on the central assembly and of the various individual mold base members 61 in the retainers 45. Each of these radial transfer paths comprises a transfer groove 40, an intermediate transfer conduit 46, and a mold feed sprue 50 and the plurality of the radial transfer paths enables molding material to be simultaneously distributed from the transfer cylinder outward and up into the depression of each unit mold base.

The various joints between the elemental parts of the flow channels do not have seal elements to minimize or prevent leakage since such seals have been found to be unnecessary in practice as the transfer material is generally of sufficiently high viscosity, the pressures involved are sufficiently low, and the clearances between the various parts of the device are sufficiently small, e.g., slip fits. Of course, if the viscosity of the material were reduced or the pressures were increased an appreciable extent, appropriate abutting, interfitting or other seal elements could be readily provided.

A threaded coaxial extension 66 of reduced diameter depends from the shouldering surface 48 of the mold base member 61 and projects below the lower surface of the adapter ring 33. This extension 66 may have a square-bottomed longitudinal bore 69 which extends upwardly into the base member to within a short distance from the upper end surface of the member. It is through the metal left in this short distance that the mold feed sprue passes into the center of the base member and then turns upwardly to emerge in the center of depression 67.

In addition to providing the lower surface of the mold cavity through which the coating material is introduced via feed sprue 50, the mold base member 61 functions to position and secure an inner element to be coated in spaced relation to the interior surfaces of the mold cavity. This latter function is enabled by means incorporated in the mold base member to accommodate and clamp the lead wires 13 of an inner element. These means include lead wire holes 70 (FIGS. 5 and 6) to transversely locate and space the inner element within the mold cavity and lead wire clamping means (hereinafter described) to longitudinally locate and space the inner element within the mold cavity and to secure the inner element so spaced and located.

The pattern (preferably circular) of the lead wire holes 70 in the depression 67 is, of course, determined by the number and relative positions of the lead wires extending from the inner element to be encased. The holes 70 extend from the depression into bore 69 at points adjacent the walls of the bore so that lead wires extending therethrough will lie within, adjacent, and along, the bore walls so they may be clamped thereagainst by the lead wire clamping means.

The elements comprising the lead wire clamping means are located in the central and lower portions of base member 61 and include a cylindrical clamping member 71 disposed in the bore 69 between the square bore bottom and the uppermost end of a compressor rod 72 which forms a part of the clamp member actuation mechanism. This clamping member has a normal diameter which is something less than the diameter of bore 69 minus twice the diameter of the lead wires of the element to be encapsulated and is made of material which is resiliently deformable (rubber for example) such that when it is subjected to longitudinal compressive force, it is caused to distend in transverse section and thus transversely clamp the lead wires against the bore wall and thereby secure the inner element in spaced relation to the mold cavity.

The extension 66 has a diametrical slot 73 which extends along a substantial portion of its length and which, in effect, forms two diametrically opposed guideways which function to constrain a T-shaped compressor assembly (comprised of compressor rod 72 and a transverse member 74) to longitudinal movement in the bore 69. The transverse member 74 is engaged in the slot 73 and its ends extend out of the slot and beyond the threaded surface of the extension 66 to project within an internal re-entrant groove 75 within a finger nut 76 which is threadedly engaged with the exterior of the base member extension. When the base member 61 is properly seated in shoulder-to-shoulder relation within its retainer 45, the extension and finger nut extend below the lower surface of the adapter ring so that the finger nut is easily accessible. It is apparent that as the finger nut is rotated, the transverse member 74 and compressor rod assembly 72, being constrained by the longitudinal slot, will be moved linearly within the bore by the nut and that when the compressor rod contacts the resilient but incompressible clamping member, the clamping member will increase in diameter, reduce its annular clearance, and thereby clamp the lead wires of the inner element to be encased.

The intermediate generally hollow cylindrical mold portion 62 is separable into a convenient number of parting elements or walls (two as shown) to facilitate removal of an object which has been molded therein.

Although the intermediate mold portion may be made of any suitable material, it is preferably made of "Plexiglas" inasmuch as this material tends to obviate the need for parting agents in conjunction with most of the preferred molding materials used in the molding process and in addition permits visual inspection during the molding process. Lower ends of the intermediate mold portion seat in the counterbore 68 in the upper surface of the base portion 61 and, when so seated, the internal surfaces of the intermediate portion and the depression comprise a continuous molding cavity which may be of any form appropriate to the element to be encased. Near its upper end, the intermediate portion is externally tapered toward a shoulder surface from which extends a boss 80 having an axial opening 81 that communicates with the mold cavity.

The mold walls (parting segments) are held together at the base end by the counterbore 68 and at the upper end by internally tapered crown member 64 which (when the mold is assembled) bears on the external taper of the intermediate mold portion. In addition, the crown 64 has a bossed opening through which the boss 80 of the intermediate mold portion extends and about which the spot face portion of the spot-faced opening 55 of the clamp arm may be placed in embracing relation. When so located in axial relation to the assembled mold, the clamping arm may be forced downwardly by means of the knurled clamping nut 54 to longitudinally urge the tapers of the crown and the intermediate mold portions together which, in turn, results in the parting elements of the intermediate mold portion being urged transversely together as fell as into tight seating relation to the counterbore 68.

When assembling the parting elements about an inner element which has been located in clamped relation to the mold base member as previously described, a centering plunger 63 is placed atop the inner element within the cavity and functions to hold the upper end of the inner element in centered relation to the cavity. The plunger is slidable within the cavity under influence of gravity and has a conical countersink 82 which bears against and centers the top end of the inner element. In addition, the plunger 63 has an upper stem 83 which extends upwardly out of the top of the unit mold via the axial opening 81 and which is penetrated by a mold venting canal 84.

This centering plunger is of special importance in molds designed to encase relatively tall or long inner elements, in that it assures that the element will be centered in the upper end of the mold cavity and consequently that the product of the mold will have a uniformly thick (if desired) molded coating at all points along its length.

In operation, the transfer piston 34 is engaged by its latch 39 to the transfer piston rod 35 and is elevated out of the transfer cylinder by the power cylinder to a point permitting premixed molding compound to be placed in the transfer cylinder 31, then the piston is lowered (vent open) until it contacts the molding composition in the cylinder. At this point, the pison vent 34a is closed, the latch is disengaged from the rod, and the rod is moved downwardly until stopped by the bottoming of the power piston in the power cylinder. With the rod in this lowered position, a particular stop groove 38 will be "noted" as being next adjacent the top of the transfer piston. Then the piston rod is moved upwardly through the piston to a point where another piston rod groove is engageable by the latch. This spacing from the "noted" groove along the rod to the last mentioned groove measures and limits the stroke and, as a consequence, the displacement of the piston within the cylinder during the next downward stroke. It is apparent that the interconnected power piston will again bottom in the power cylinder after moving through this spaced distance downwardly and thus positively stop the transfer piston. By this means, the volume of molding material to be transferred to the molds is fixed for accurate control of the molding process.

Assuming that loaded unit molds (i.e. containing inner elements to be encased) are installed at all positions in the adapter ring, that the ring is positioned as shown on the central assembly, and that the stroke has been fixed as described, then in the course of the next bottoming stroke of the power piston, the tranfer piston is caused to displace a measured volume with the result that a substantially equal amount of molding material is caused to flow along each of the previously described radial flow paths of the apparatus to each separate unit mold.

In practice, the transfer displacement is set at a definite volume somewhat less than the total net volume of the loaded unit mold cavities; thus a definite unfilled volume remains in each mold cavity to permit a definite degree of self-foaming action by the molding material to fill the cavity. As the material foams and rises in the net annular space between the walls of the mold cavity and the exterior of the element being encased, it comes into contact with and exerts sufficient force to lift the centering plunger 63 from the upper end of the element being encased and thereby automatically provides a clearance at the upper end of the inner element, which permits the foamed molding material to completely enclose the inner element in order to produce the new article of this invention. The central vent or canal in the centering plunger stem limits the pressure within the mold cavity by permitting air and excess of molding material to escape. The escape of excess material tends to purge the mold cavity of any undesirable foreign material which may be present.

The foam-filled loaded unit molds may then be removed from the adapter ring or the entire adapter ring with its unit molds may be removed from the central assembly, and be replaced by different loaded unit molds or a different adapter ring set of loaded unit molds to be foam filled. After a short time, the foamed material in the removed molds will have vulcanized at room or other temperature and the finished article comprising a foam encased inner element may be removed by disassembly of the unit molds by reversing the order of the procedure described for their loading and assembly.

Figure 7:
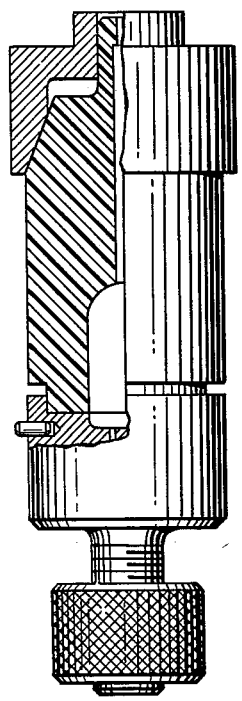
FIG. 7 is a longitudinal sectional view of another unit mold embodiment.

The unit mold embodiment of FIG. 7 omits the centering plunger previously described and the mold cavity vent is in the end of the intermediate mold portion itself. This type of mold may be used where short squatty inner elements are to be encased since a slight angular misalignment of a relatively short inner element within the mold cavity will not cause intolerable variations in the wall thickness of the encasing material.

Figure 8:
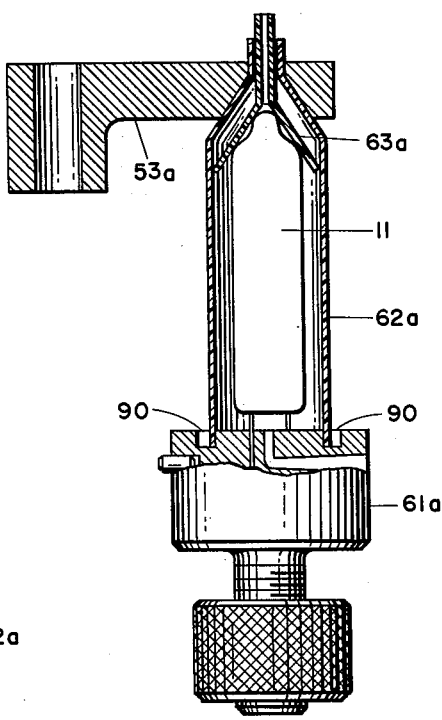
FIG. 8 is a longitudinal sectional view of still another form of unit mold.
Figure 9:
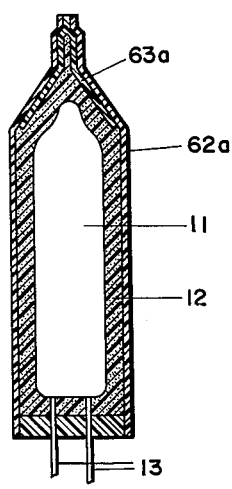
FIG. 9 is a longitudinal sectional view of an encased article produced by the unit mold of FIG. 8.

FIG. 8 illustrates another type of unit mold wherein the intermediate mold portion becomes an integral part of the product, as shown in FIG. 9. This type of mold may be used with the transfer mechanism of the preferred embodiment having a slightly modified clamping arm 53a which differs from clamping arm 53 in that the opening in its distal end is countersunk to conform to the upper end of this type of mold. The unit mold is comprised of a base member 61a, and intermediate mold portion 62a, and a vented centering plunger 63a. The base member 61a is similar to the base member of the preferred embodiment with the exception that its top surface has a groove 90 (which encircles the pattern made by small holes 70) with inner edge adapted to receive and center intermediate mold portion 62a by engaging the lower end of its inside surface. The intermediate mold portion 62a is shown generally cylindrical having a tapered upper end which conforms to the inner surface of the countersink in clamping arm 53a so that endwise force may be applied to hold the bottom edge of the intermediate mold portion in sealed relation to the bottom of groove 90.

When the molding of a relatively long object is contemplated, an inverted funnel-shaped centering plunger 63a is used within the upper portion of the mold cavity to center the object in the same fashion as has been described for the centering plunger 63 in the preferred embodiment.

The mold parts 62a and 63a become integral parts of the finished encased article and although they may be made of any suitable material, they are preferably made of thin transparent thermoplastic material having a suitable degree of dimensional stability, e.g., cellulose-acetate-butyrate.

This mold is filled in a manner similar to that described in the preferred embodiment, with gasses and excess material being vented to the mold exterior via the stem of centering plunger 63a which extends through the upper end portion of 62a. After the foamed-in-place material has cured or vulcanized, the coated article (comprised of inner element 11, mold parts 62a and 63a, and foamed material 12 therebetween) is unclamped and removed from the mold base. Finishing operations may involve, if desired, cutting off the centering plunger stem and heat sealing the top of the article and, finally, filling and sealing the lower end with epoxy resin, for example.

Thus it has been seen that the present invention provides a new and improved apparatus for manufacturing electrical components which are highly suitable for subsequent encapsulation. With the present device relatively delicate inner elements are provided with a protective resiliently compressible cellular buffer member of improved resistance to penetrations by potting or encapsulation materials. This improved buffer member minimizes or substantially eliminates destructive stress transfer between the inner element and the resin mass in which the improved component may be ultimately placed and thereby results in enhanced reliability of circuitry of which this new and improved component may form a part.

As various changes may be made in the form, construction and arrangement of the parts herein without departing from the spirit and scope of the invention and without sacrificing any of its advantages, it is to be understood that all matter herein is to be interpreted as illustrative and not in a limiting scope.

What is claimed is:

1. Apparatus for use in molding comprising the combination of a centrally positioned reservoir, flange means projecting from and encircling said reservoir having a peripheral surface and a plurality of circumferentially spaced and substantially radially extending passageways communicating with said peripheral surface and said reservoir, a reciprocable piston in said reservoir for forcing material out of the reservoir simultaneously through said passageways, a separate annular member carried by said flange means and extending about said peripheral surface having additional passageways registering with the passageways of said flange means and forming continuations thereof, and a plurality of seating means separable from and carried by said annular member adjacent said additional passageways each having a conduit therein registering at one end with one of said additional passageways of said annular member and forming continuations thereof and leading to a discharge location at a generally horizontal upper surface of the seating means.

2. Apparatus as claimed in claim 1 wherein means is associated with said piston for selectively positioning the piston in the reservoir and varying the length of stroke thereof.

3. Apparatus as claimed in claim 2 wherein the means associated with the piston comprises an annularly grooved piston rod and latching means carried by the piston for selective engagement with the rod to limit displacement of said piston to a predetermined stroke.

4. Apparatus as claimed in claim 1 wherein a plurality of upper seating means are carried by and spaced above said annular member and each projects over a first-mentioned seating means with the upper and first mentioned seating means being adapted to releasably retain molding means therebetween.

5. Apparatus as claimed in claim 4 wherein each of said upper seating means includes a pivotally mounted longitudinally adjustable arm portion and a clamping member for holding said arm portion in a desirable vertical position in relation to said first mentioned seating means.

6. Apparatus as claimed in claim 4 wherein said upper seating means and said first-mentioned seating means are provided with respectively separable and generally concave surfaces disposed toward each other for contacting spaced apart and oppositely disposed end portions of the intermediate molding means.

7. Apparatus as claimed in claim 1 wherein resilient, laterally deflectable clamping means is operatively associated with each of said seating means for clamping lead wires extending from an element disposed over the seating means against a wall of said seating means for maintianing said element in position, and there is provided plunger means to compress the clamping means and thereby effect the lateral deflection.

References Cited in the file of this patent

UNITED STATES PATENTS

| | | |
|---|---|---|
| 2,418,823 | Desimone | Apr. 15, 1947 |
| 2,476,219 | Purinton | July 12, 1949 |
| 2,526,797 | Ashbaugh | Oct. 24, 1950 |
| 2,672,653 | Simpkins et al. | Mar. 23, 1954 |
| 2,701,392 | Eich | Feb. 8, 1955 |
| 2,724,862 | Merrill et al. | Nov. 29, 1955 |
| 2,733,479 | English | Feb. 7, 1956 |
| 2,825,093 | High | Mar. 4, 1958 |
| 2,857,626 | Wagner et al. | Oct. 28, 1958 |
| 2,880,462 | Lehman | Apr. 7, 1959 |
| 2,885,735 | Dittmore et al. | May 12, 1959 |
| 2,924,850 | Schultz | Feb. 16, 1960 |
| 2,967,346 | McMaster et al. | Jan. 10, 1961 |